(12) United States Patent
Zhang

(10) Patent No.: US 11,758,544 B2
(45) Date of Patent: Sep. 12, 2023

(54) METHOD FOR PROVIDING FEEDBACK ON RECEIVING OF CONTROL SIGNALING, BASE STATION AND TERMINAL

(71) Applicant: GUANGDONG OPPO MOBILE TELECOMMUNICATIONS CORP., LTD., Guangdong (CN)

(72) Inventor: Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/576,037

(22) Filed: Sep. 19, 2019

(65) Prior Publication Data

US 2020/0015209 A1 Jan. 9, 2020

Related U.S. Application Data

(63) Continuation of application No. PCT/CN2017/077378, filed on Mar. 20, 2017.

(51) Int. Cl.
*H04W 72/23* (2023.01)
*H04W 68/00* (2009.01)
*H04L 5/00* (2006.01)

(52) U.S. Cl.
CPC ........... *H04W 72/23* (2023.01); *H04L 5/0055* (2013.01); *H04W 68/005* (2013.01)

(58) Field of Classification Search
CPC .. H04W 72/042; H04W 68/005; H04L 5/0055
See application file for complete search history.

(56) References Cited

U.S. PATENT DOCUMENTS

2009/0268693 A1 10/2009 Lindh et al.
2011/0269490 A1 11/2011 Earnshaw et al.
(Continued)

FOREIGN PATENT DOCUMENTS

CN 101388756 A 3/2009
CN 101488832 A 7/2009
(Continued)

OTHER PUBLICATIONS

The Search Report of corresponding European application No. 17901519.3, dated Jul. 22, 2020.
(Continued)

*Primary Examiner* — Jackie Zuniga Abad
(74) *Attorney, Agent, or Firm* — Ladas & Parry LLP

(57) ABSTRACT

The embodiments of the present disclosure disclose a control signaling transmission method, a base station and a terminal, the method includes: sending, by a base station, a first downlink control signaling to a terminal, and indicating, through the first downlink control signaling, whether the terminal needs to feed back an acknowledgement message corresponding to a reception of the first downlink control signaling; and receiving the acknowledgement message fed back by the terminal if the base station indicates that the terminal needs to feed back the acknowledgement message corresponding to the reception of the first downlink control signaling. The embodiments of the present disclosure can ensure that the base station knows the reception of important control signaling in time, facilitate the configuration and transmission of subsequent control signaling, and improve the reliability of a 5G NR system.

6 Claims, 10 Drawing Sheets

A base station sends a first downlink control signaling to a terminal, and indicates, through the first downlink control signaling, whether the terminal needs to feed back an acknowledgement message corresponding to a reception of the first downlink control signaling — S201

Receive the acknowledgement message fed back by the terminal if the base station indicates that the terminal needs to feed back the acknowledgement message corresponding to the reception of the first downlink control signaling — S202

(56) References Cited

U.S. PATENT DOCUMENTS

| | | | |
|---|---|---|---|
| 2013/0176952 A1* | 7/2013 | Shin | H04W 72/042 |
| | | | 370/329 |
| 2014/0169312 A1 | 6/2014 | Wang et al. | |
| 2015/0085714 A1* | 3/2015 | Liang | H04L 5/1469 |
| | | | 370/280 |
| 2015/0296490 A1 | 10/2015 | Yi et al. | |
| 2015/0326354 A1* | 11/2015 | Li | H04W 52/262 |
| | | | 370/329 |
| 2016/0073391 A1* | 3/2016 | Awad | H04L 1/1864 |
| | | | 370/329 |
| 2016/0261391 A1 | 9/2016 | Chen et al. | |
| 2019/0109672 A1* | 4/2019 | Kim | H04L 5/001 |
| 2020/0015209 A1 | 1/2020 | Zhang | |

FOREIGN PATENT DOCUMENTS

| | | | |
|---|---|---|---|
| CN | 101541063 A | 9/2009 | |
| CN | 102025467 A | 4/2011 | |
| CN | 102158976 A | 8/2011 | |
| CN | 102237927 A | 11/2011 | |
| CN | 103178942 A | 6/2013 | |
| CN | 106455100 A | 2/2017 | |
| GB | 2540636 A | 1/2017 | |
| KR | 20110004785 A | 1/2011 | |
| RU | 2335867 C2 | 10/2008 | |
| WO | WO-2014171754 A1 * | 10/2014 | H04L 5/0055 |
| WO | 2016123393 A1 | 8/2016 | |

OTHER PUBLICATIONS

The First Office Action of corresponding Russian application No. 2019132930, dated Jun. 4, 2020.
International Search Report dated Nov. 10, 2017 for Application No. PCT/CN2017/077378.
LG Electronics, 3GPP TSG RAN WG1 Meeting #85; R1-164514; Discussion on details of (E)PDCCH used for sidelink SPS, Nanjing, China May 23-27, 2016, pp. 1-4.
The first Office Action of corresponding Canadian application No. 3057380, dated Nov. 9, 2020.
The Partial Search Report of corresponding European application No. 17901915.3, dated Mar. 9, 2020.
The first Office Action of corresponding European application No. 17901915.3, dated Dec. 22, 2020.
The first Office Action of corresponding Chilean application No. 201902684, dated Jan. 7, 2021.
The first Office Action of corresponding Singaporean application No. 11201908776R, dated Mar. 23, 2021.
The second Office Action of corresponding European application No. 17901915.3, dated Apr. 14, 2021.
Samsung: "On UE-Common NR-PDCCH," 3GPP Draft; R1-1702970, vol. RAN WG1, No. Athens, Greece; Feb. 12, 2017(Feb. 12, 2017).
The first Office Action of corresponding India application No. 201917041557, dated Apr. 24, 2021.
The first Office Action of corresponding Korean application No. 10-2019-7030713, dated May 12, 2021.
The second Office Action of corresponding Canada application No. 3057380, dated Sep. 3, 2021.
The second Office Action of corresponding Chile application No. 201902684, dated Sep. 8, 2021.
The third Office Action of corresponding European application No. 17901915.3, dated Sep. 23, 2021.
The first Office Action of corresponding Israeli application No. 269493, dated Feb. 20, 2022.
The first Office Action of corresponding Chinese application No. 202010091786.8, dated Feb. 28, 2022.
The Notice of Rejection of corresponding Chilean application No. 201902684, dated Apr. 4, 2022.
The first Office Action of corresponding Indonesian application No. P00201909328, dated May 10, 2022.
The Decision of Rejection of corresponding Korean application No. 10-2019-7030713, dated Nov. 30, 2021.
The first Office Action of corresponding Australian application No. 2017405380, dated Jan. 17, 2022.
The Notice of Allowance of corresponding Chinese application No. 202010091786.8, dated Aug. 30, 2022.
The second Office Action of corresponding Singaporean application No. 11201908776R, dated Nov. 8, 2022.
The first Office Action of corresponding Chinese application No. 201780088782.0, dated Jul. 14, 2023.

* cited by examiner

METHOD FOR PROVIDING FEEDBACK ON RECEIVING OF CONTROL SIGNALING, BASE STATION AND TERMINAL

CROSS-REFERENCE TO RELATED APPLICATION

This application is a continuation of International Application No. PCT/CN2017/077378, filed on Mar. 20, 2017, the content of which is incorporated herein by reference in its entirety.

TECHNICAL FIELD

The present disclosure relates to the field of communications technologies, and in particular, to a control signaling transmission method, a base station and a terminal.

BACKGROUND

In the Long Term Evolution (LTE) system, in order to communicate with a terminal, a base station can send a downlink control signaling (DCI) to the terminal by carrying the downlink control signaling in a Physical Downlink Control Channel (PDCCH). The content includes uplink and downlink resource scheduling information, Hybrid Auto Repeat Request (HARQ) information, power control information, etc. These types of key information are very important for the base station to perform normal communication with the terminal.

In an existing LTE system, since the DCI usually carries the uplink scheduling information or the downlink scheduling information, the base station can indirectly determine whether the terminal has received the DCI by whether the terminal sends uplink data corresponding to the uplink scheduling information, or whether the terminal feeds back an acknowledgement/non-acknowledgement (ACK/NACK) message for downlink data after receiving the downlink data corresponding to the downlink scheduling information. However, in such a manner, the base station cannot directly and accurately know whether the terminal successfully receives the DCI, and the obtained result has low reliability, which is disadvantageous for the base station to perform configuration and transmission of subsequent related control signaling. Especially in a 5th Generation (5G) New Radio (NR) system, a considerable amount of important information needs to be dynamically indicated to the terminal. When the important information is transmitted through the DCI, whether the base station can quickly know whether the terminal correctly receives the information is critical to improving the reliability of the NR system, since a series of subsequent control signalings of the base station may be configured based on the information in some previous important control signalings. Once an important control signaling that has been previously transmitted is lost and the base station does not know that situation, the subsequent control signaling of the base station actually becomes useless. Once such an error occurs, it will have serious adverse effect on the reliability of the 5G NR system.

SUMMARY

The embodiments of the present disclosure provide a control signaling transmission method, a base station and a terminal, which can ensure that the base station knows the reception of important control signaling in time, facilitate the configuration and transmission of subsequent control signaling, and improve the reliability of the 5G NR system.

A first aspect of the embodiments of the present disclosure provides a control signaling transmission method, including:
  sending, by a base station, a first downlink control signaling to a terminal, and indicating, through the first downlink control signaling, whether the terminal needs to feed back an acknowledgement message corresponding to a reception of the first downlink control signaling; and
  receiving the acknowledgement message fed back by the terminal if the base station indicates that the terminal needs to feed back the acknowledgement message corresponding to the reception of the first downlink control signaling.

In a possible implementation, the indicating, through the first downlink control signaling, whether the terminal needs to feed back an acknowledgement message corresponding to a reception of the first downlink control signaling comprises:
  configuring, by the base station, a preset bit in the first downlink control signaling to indicate whether the terminal needs to feed back the acknowledgement message corresponding to the reception of the first downlink control signaling.

In a possible implementation, the indicating, by the base station, whether the terminal needs to feed back an acknowledgement message corresponding to a reception of the first downlink control signaling comprises:
  pre-configuring, by the base station, a type of information for which the acknowledgement message needs to be fed back, and sending the type of the information to the terminal, or pre-storing, by the terminal, a type of the information for which the acknowledgement message needs to be fed back; and
  indicating, through the type of the information comprised in the first downlink control signaling, whether the terminal needs to feed back the acknowledgement message corresponding to the reception of the first downlink control signaling.

In a possible implementation, if the base station indicates that the terminal needs to feed back the acknowledgement message corresponding to the reception of the first downlink control signaling, the method further comprises:
  allocating, by the base station, a resource for feeding back the acknowledgment message to the terminal in which information about the resource is included in the first downlink control signaling.

In a possible implementation, the allocating, by the base station, the resource for feeding back the acknowledgment message to the terminal comprises:
  allocating, by the base station, according to a current resource occupation, a physical uplink control channel resource to the terminal for feeding back the acknowledgement message; or
  allocating, by the base station, a reserved physical uplink control channel resource to the terminal for feeding back the acknowledgement message; or
  selecting, by the base station, at least one resource from a pre-configured candidate resource list of physical uplink control channel and allocating to the terminal for feeding back the acknowledgement message.

In a possible implementation, the first downlink control signaling is a common downlink control signaling that is sent to at least two terminals, and the method further comprises:
  adding, by the base station, version number information to the common downlink control signaling, wherein the version number information is used to distinguish different common downlink control signalings; and after sending the common downlink control signaling and indicating, through the common downlink control signaling, that the terminal needs to feed back the acknowledgement message corresponding to the reception of the common downlink control signaling, the method further comprises:

receiving the version number information that is fed back by the terminal through a pre-configured physical uplink control channel resource.

In a possible implementation, the first downlink control signaling is a common downlink control signaling that is sent to at least two terminals, and the method further comprises:

adding, by the base station, version number information to the common downlink control signaling, wherein the version number information is used to distinguish different common downlink control signalings; and after sending the common downlink control signaling, the method further comprises:

sending, by the base station, a second downlink control signaling to the terminal, wherein the second downlink control signaling comprises a version number of the common downlink control signaling that needs to be acknowledged by the terminal and resource information that is allocated to the terminal for feeding back the acknowledgement message.

A second aspect of the embodiments of the present disclosure provides a control signaling transmission method, including:

receiving, by a terminal, a first downlink control signaling sent by a base station;

determining, by the terminal, according to the first downlink control signaling, whether there is a need to feed back an acknowledgment message corresponding to a reception of the first downlink control signaling; and sending, by the terminal, the acknowledgement message to the base station if the terminal needs to feed back the acknowledgement message corresponding to the reception of the first downlink control signaling.

In a possible implementation, the determining, by the terminal, according to the first downlink control signaling, whether there is a need to feed back an acknowledgment message corresponding to a reception of the first downlink control signaling comprises:

obtaining, by the terminal, a value of a preset bit in the first downlink control signaling, and determining, through the value of the preset bit, whether there is a need to feed back the acknowledgement message corresponding to the reception of the first downlink control signaling.

In a possible implementation, the determining, by the terminal, according to the first downlink control signaling, whether there is a need to feed back an acknowledgment message corresponding to a reception of the first downlink control signaling comprises:

receiving, by the terminal, a type of information pre-configured by the base station and for which the acknowledgement message needs to be fed back, or pre-storing, by the terminal, a type of the information for which the acknowledgement message needs to be fed back; and determining, according to the type of the information included in the first downlink control signaling, whether there is a need to feed back the acknowledgement message corresponding to the reception of the first downlink control signaling.

In a possible implementation, if the terminal needs to feed back the acknowledgement message corresponding to the reception of the first downlink control signaling, the method further comprises:

obtaining, by the terminal, information about a resource allocated by the base station to the terminal, from the first downlink control signaling, wherein the resource is used by the terminal to feed back the acknowledgement message.

In a possible implementation, the terminal belongs to a terminal group that receives a same downlink control signaling, and the first downlink control signaling is a common downlink control signaling that is sent to at least two terminals, and the method further comprises:

obtaining version number information from the common downlink control signaling, wherein the version number information is used to distinguish different common downlink control signalings; and feeding back, through a pre-configured physical uplink control channel resource, the version number information to the base station.

In a possible implementation, the terminal belongs to a terminal group that receives a same downlink control signaling, and the first downlink control signaling is a common downlink control signaling that is sent to at least two terminals, and the method further comprises:

obtaining version number information from the common downlink control signaling, wherein the version number information is used to distinguish different common downlink control signalings;

receiving a second downlink control signaling sent by the base station to the terminal, wherein the second downlink control signaling comprises a version number of the common downlink control signaling that needs to be acknowledged by the terminal and resource information that is allocated to the terminal for feeding back the acknowledgement message; and feeding back the acknowledgement message to the base station.

A third aspect of the embodiments of the present disclosure provides a base station, including:

a sending unit, configured to send a first downlink control signaling to a terminal;

a processing unit, configured to indicate, through the first downlink control signaling, whether the terminal needs to feed back an acknowledgement message corresponding to a reception of the first downlink control signaling; and a receiving unit, configured to receive the acknowledgement message fed back by the terminal if the base station indicates that the terminal needs to feed back the acknowledgement message corresponding to the reception of the first downlink control signaling.

In a possible implementation, the processing unit is specifically configured to:

configure a preset bit in the first downlink control signaling to indicate whether the terminal needs to feed back the acknowledgement message corresponding to the reception of the first downlink control signaling.

In a possible implementation, the processing unit is specifically configured to:

pre-configure a type of information for which the acknowledgement message needs to be fed back, and the sending unit is further configured to send the type of the information to the terminal, or a type of the information for which the acknowledgement message needs to be fed back is pre-stored by the terminal; and indicate, through the type of the information comprised in the first downlink control signaling, whether the terminal needs to feed back the acknowledgement message corresponding to the reception of the first downlink control signaling.

In a possible implementation, if the processing unit indicates that the terminal needs to feed back the acknowledgement message corresponding to the reception of the first downlink control signaling, the processing unit is further configured to:

allocate, to the terminal, a resource for feeding back the acknowledgment message in which information about the resource is included in the first downlink control signaling.

In a possible implementation, the processing unit is specifically configured to:

allocate, according to a current resource occupation, a physical uplink control channel resource to the terminal for feeding back the acknowledgement message; or allocate a reserved physical uplink control channel resource to the terminal for feeding back the acknowledgement message; or select at least one resource from a pre-configured candidate resource list of physical uplink control channel and allocate to the terminal for feeding back the acknowledgement message.

In a possible implementation, the first downlink control signaling is a common downlink control signaling that is sent to at least two terminals, the processing unit is further configured to add version number information to the common downlink control signaling, wherein the version number information is used to distinguish different common downlink control signalings; and after sending the common downlink control signaling and indicating, through the common downlink control signaling, that the terminal needs to feed back the acknowledgement message corresponding to the reception of the common downlink control signaling, the receiving unit is further configured to receive the version number information that is fed back by the terminal through a pre-configured physical uplink control channel resource.

In a possible implementation, the first downlink control signaling is a common downlink control signaling that is sent to at least two terminals, the processing unit is further configured to add version number information to the common downlink control signaling, wherein the version number information is used to distinguish different common downlink control signalings; and the sending unit is further configured to, after sending the common downlink control signaling, send a second downlink control signaling to the terminal, wherein the second downlink control signaling comprises a version number of the common downlink control signaling that needs to be acknowledged by the terminal and resource information that is allocated to the terminal for feeding back the acknowledgement message.

A fourth aspect of the embodiments of the present disclosure provides a base station, including:

a processor, a memory, a transceiver and a bus, the processor, the memory and the transceiver being coupled by the bus, wherein the transceiver is configured to transmit and receive signals and communicate with a terminal, the memory is configured to store a set of program codes, and the processor is configured to invoke the program codes stored in the memory and perform the following operations:

sending, by the transceiver, a first downlink control signaling to the terminal, and indicating, through the first downlink control signaling, whether the terminal needs to feed back an acknowledgement message corresponding to a reception of the first downlink control signaling; and receive, through the transceiver, the acknowledgement message fed back by the terminal if the base station indicates that the terminal needs to feed back the acknowledgement message corresponding to the reception of the first downlink control signaling.

In a possible implementation, the processor is specifically configured to configure a preset bit in the first downlink control signaling to indicate whether the terminal needs to feed back the acknowledgement message corresponding to the reception of the first downlink control signaling.

In a possible implementation, the processor is specifically configured to pre-configure a type of information for which the acknowledgement message needs to be fed back, and send, through the transceiver, the type of the information to the terminal, or a type of the information for which the acknowledgement message needs to be fed back is pre-stored by the terminal; and the processor is further configured to indicate, through the type of the information comprised in the first downlink control signaling, whether the terminal needs to feed back the acknowledgement message corresponding to the reception of the first downlink control signaling.

In a possible implementation, if the base station indicates that the terminal needs to feed back the acknowledgement message corresponding to the reception of the first downlink control signaling, the processor is further configured to:

allocate to the terminal a resource for feeding back the acknowledgment message in which information about the resource is included in the first downlink control signaling.

In a possible implementation, the processor is specifically configured to:

Allocate, according to a current resource occupation, a physical uplink control channel resource to the terminal for feeding back the acknowledgement message; or allocate a reserved physical uplink control channel resource to the terminal for feeding back the acknowledgement message; or select at least one resource from a pre-configured candidate resource list of physical uplink control channel and allocate to the terminal for feeding back the acknowledgement message.

In a possible implementation, the first downlink control signaling is a common downlink control signaling that is sent to at least two terminals, the processor is further configured to add version number information to the common downlink control signaling, wherein the version number information is used to distinguish different common downlink control signalings; and receive, through the transceiver, the version number information that is fed back by the terminal through a pre-configured physical uplink control channel resource, after sending the common downlink control signaling and indicating, through the common downlink control signaling, that the terminal needs to feed back the acknowledgement message corresponding to the reception of the common downlink control signaling.

In a possible implementation, the first downlink control signaling is a common downlink control signaling that is sent to at least two terminals,
   the processor is further configured to add version number information to the common downlink control signaling, wherein the version number information is used to distinguish different common downlink control signalings; and
   send, through the transceiver, a second downlink control signaling to the terminal after sending the common downlink control signaling, wherein the second downlink control signaling comprises a version number of the common downlink control signaling that needs to be acknowledged by the terminal and resource information that is allocated to the terminal for feeding back the acknowledgement message.

A fifth aspect of the embodiments of the present disclosure provides a terminal, including:
   a receiving unit, configured to receive a first downlink control signaling sent by a base station;
   a processing unit, configured to determine, according to the first downlink control signaling, whether there is a need to feed back an acknowledgment message corresponding to a reception of the first downlink control signaling; and
   a sending unit, configured to send the acknowledgement message to the base station if the terminal needs to feed back the acknowledgement message corresponding to the reception of the first downlink control signaling.

In a possible implementation, the processing unit is specifically configured to:
   obtain a value of a preset bit in the first downlink control signaling, and determine, according to the value of the preset bit, whether there is a need to feed back the acknowledgement message corresponding to the reception of the first downlink control signaling.

In a possible implementation, the receiving unit is further configured to receive a type of information pre-configured by the base station and for which the acknowledgement message needs to be fed back, or a type of the information for which the acknowledgement message needs to be fed back is pre-stored by the terminal;
   the processing unit is specifically configured to determine, according to the type of the information comprised in the first downlink control signaling, whether there is a need to feed back the acknowledgement message corresponding to the reception of the first downlink control signaling.

In a possible implementation, the terminal belongs to a terminal group that receives a same downlink control signaling, and the first downlink control signaling is a common downlink control signaling that is sent to at least two terminals,
   the processing unit is further configured to obtain version number information from the common downlink control signaling, wherein the version number information is used to distinguish different common downlink control signalings; and
   the sending unit is further configured to feed back, through a pre-configured physical uplink control channel resource, the version number information to the base station.

In a possible implementation, the terminal belongs to a terminal group that receives a same downlink control signaling, and the first downlink control signaling is a common downlink control signaling that is sent to at least two terminals,
   the processing unit is further configured to obtain version number information from the common downlink control signaling, wherein the version number information is used to distinguish different common downlink control signalings;
   the receiving unit is further configured to receive a second downlink control signaling sent by the base station to the terminal, wherein the second downlink control signaling comprises a version number of the common downlink control signaling that needs to be acknowledged by the terminal and resource information that is allocated to the terminal for feeding back the acknowledgement message; and
   the sending unit is further configured to feed back the acknowledgement message to the base station.

A sixth aspect of the embodiments of the present disclosure provides a terminal, including:
   a processor, a memory, a transceiver and a bus, the processor, the memory and the transceiver being coupled by the bus, wherein the transceiver is configured to transmit and receive signals and communicate with a base station, the memory is configured to store a set of program codes, and the processor is configured to invoke the program codes stored in the memory and perform the following operations:
   receiving, through the transceiver, a first downlink control signaling sent by the base station;
   determining, according to the first downlink control signaling, whether there is a need to feed back an acknowledgment message corresponding to a reception of the first downlink control signaling; and
   sending, through the transceiver, the acknowledgement message to the base station if the terminal needs to feed back the acknowledgement message corresponding to the reception of the first downlink control signaling.

In a possible implementation, the processor is specifically configured to:
   obtain a value of a preset bit in the first downlink control signaling, and determining, through the value of the preset bit, whether there is a need to feed back the acknowledgement message corresponding to the reception of the first downlink control signaling.

In a possible implementation, the processor is specifically configured to:
   receive, through the transceiver, a type of information pre-configured by the base station and for which the acknowledgement message needs to be fed back, or a type of the information for which the acknowledgement message needs to be fed back is pre-stored by the terminal;
   determine, according to the type of the information comprised in the first downlink control signaling, whether there is a need to feed back the acknowledgement message corresponding to the reception of the first downlink control signaling.

In a possible implementation, if the terminal needs to feed back the acknowledgement message corresponding to the reception of the first downlink control signaling, the processor is further configured to:
   obtain information about a resource allocated by the base station to the terminal, from the first downlink control signaling, wherein the resource is used by the terminal to feed back the acknowledgement message.

In a possible implementation, the terminal belongs to a terminal group that receives a same downlink control signaling, and the first downlink control signaling is a common downlink control signaling that is sent to at least two terminals, the processor is further configured to obtain version number information from the common downlink control signaling, wherein the version number information is used to distinguish different common downlink control signalings; and feed back, through the transceiver, the version number information to the base station through a pre-configured physical uplink control channel resource.

In a possible implementation, the terminal belongs to a terminal group that receives a same downlink control signaling, and the first downlink control signaling is a common downlink control signaling that is sent to at least two terminals, the processor is further configured to obtain version number information from the common downlink control signaling, wherein the version number information is used to distinguish different common downlink control signalings;

receive, through the transceiver, a second downlink control signaling sent by the base station to the terminal, wherein the second downlink control signaling includes a version number of the common downlink control signaling that needs to be acknowledged by the terminal and resource information that is allocated to the terminal for feeding back the acknowledgement message; and feed back, through the transceiver, the acknowledgement message to the base station.

A seventh aspect of the embodiments of the present disclosure provides a computer storage medium, the computer storage medium including a set of program codes for performing the method according to any one of the implementations of the first aspect of the embodiments of the present disclosure.

An eighth aspect of the embodiments of the present disclosure provides a computer storage medium, the computer storage medium comprising a set of program codes for performing the method according to any one of the implementations of the second aspect of the embodiments of the present disclosure.

The embodiments of the present disclosure have the following beneficial effects:

When the base station needs to obtain the condition about the reception of the first downlink control signaling by the terminal, the first downlink control signaling can be used to instruct the terminal to feed back an acknowledgement message corresponding to reception of the first control signaling, which facilitates the base station to directly, accurately and quickly know the reception on the terminal side, facilitates the configuration and transmission of subsequent control signaling, and improves the reliability of a 5G NR system.

BRIEF DESCRIPTION OF DRAWINGS

In order to more clearly illustrate the embodiments of the present disclosure or the technical solutions in the prior art, the drawings to be used in the embodiments will be briefly described below. Obviously, the drawings in the following description are only some embodiments of the present disclosure, and those skilled in the art can obtain other drawings according to the drawings without any creative effort.

DETAILED DESCRIPTION OF EMBODIMENTS

The terms "comprise", "have" and variations thereof in the specification and claims and the above drawings of the present disclosure are intended to cover a non-exclusive inclusion. For example, a process, method, system, product, or device that comprises a series of steps or units is not limited to the listed steps or units, but optionally includes steps or units not listed, or alternatively, other steps or units inherent to such processes, methods, products, or devices.

With the continuous improvement of people's communication needs, the communication technology is developing fast, which can provide users with more bandwidth and faster uplink and downlink transmission speeds. For example, in a 5G system, system bandwidths up to 200 MHz can be provided. However, as the number of users continues to increase, the reliability of system operation becomes more and more important. In order to ensure normal and reliable communication between a base station and a terminal, the base station wants to know whether the control signaling that it sends to the terminal is correctly received by the terminal. Therefore, the embodiments of the present disclosure provide a control signaling transmission method, so that the terminal can determine whether to feed back on a reception of DCI, according to an indication of the base station after receiving the DCI sent by the base station, and send an acknowledgement message to the base station when the feedback is needed. For convenience of description, the embodiments of the present disclosure are described by a 5G system. It should be understood by those skilled in the art that the implementations in the embodiments of the present disclosure are applicable to the existing communication system and a future communication system of a higher level, such as 6G and 7G, which are not limited in the embodiments of the present disclosure.

The control signaling transmission method and device according to the embodiments of the present disclosure are described in detail below with reference to the accompanying drawings.

Figure 1:
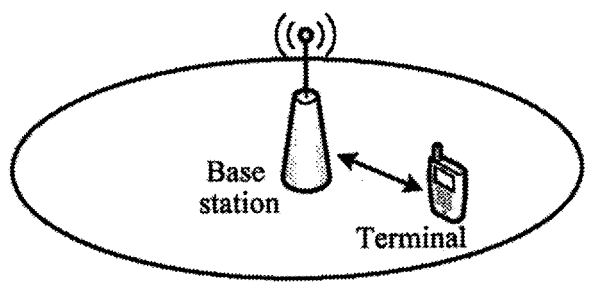
FIG. 1 is a schematic structural diagram of a communication system in an embodiment of the present disclosure.

Please refer to FIG. 1, which is a schematic structural diagram of a communication system in an embodiment of the present disclosure, where a base station and at least one terminal may be included, and the terminal may also be referred to as user equipment (UE).

The base station may be an evolved Node B (eNB), a Node B (NB), a Base Station Controller (BSC), a Base Transceiver Station (Base Transceiver Station, BTS), a home base station (for example, Home evolved NodeB, or Home Node B, HNB), a BaseBand Unit (BBU), or the like. The base station may also be referred to by those skilled in the art as a base transceiver station, a wireless base station, a wireless transceiver, a transceiver function, a Base Station Subsystem (BSS), or some other suitable terminology. The base station may carry and schedule downlink control signaling in PDCCH, which may specifically include information about transmission format, resource allocation, uplink scheduling grant, power control, and uplink retransmission, or the like. In addition, the base station may transmit downlink traffic data to UE, and receive retransmission feedback or the like from the terminal. For a control signaling that requires the terminal to feedback an acknowledgement message, the base station may indicate in the DCI, and if the base station does not indicate, the terminal may not perform feedback, thereby saving resource overhead.

The terminal may include a cellular phone, a smart phone, a Session Initiation Protocol (SIP) phone, a laptop computer, a Personal Digital Assistant (PDA), a satellite radio, a global positioning system, a multimedia device, a video device, a digital audio player (e.g., MP3 player), a camera, a game console, or any other similarly functioning device. The terminal may also be referred to by a person skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handheld device, a user agent, a mobile client, a client, or some other suitable terminology. The terminal may receive a control signaling configured by the base station and time domain resources and/or frequency domain resources and/or code domain resources scheduled by the base station to perform transmission of uplink traffic data and the acknowledgement message.

The control signaling transmission method of the present disclosure will be described in detail below with reference to FIG. 2-FIG. 5.

Figure 2:
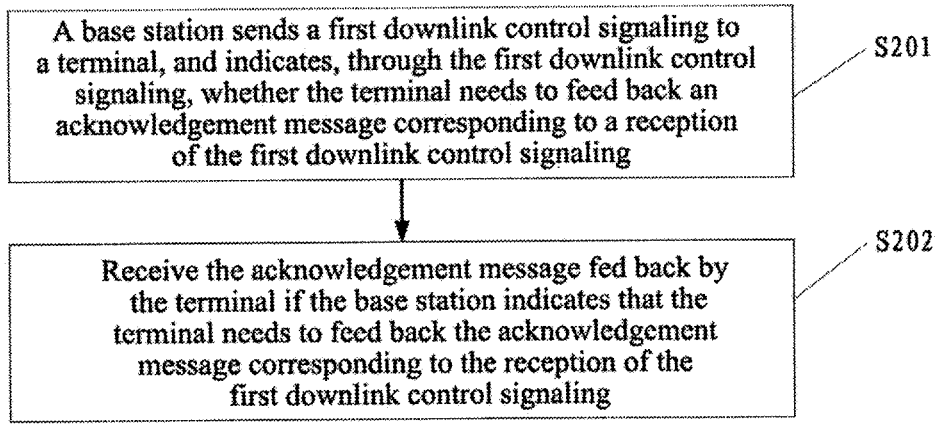
FIG. 2 is a schematic flowchart of a first embodiment of a control signaling transmission method according to the present disclosure.

Please refer to FIG. 2, which is a schematic flowchart of a first embodiment of a control signaling transmission method according to the present disclosure; in the present embodiment, the control signaling transmission method includes the following steps:

S201, a base station sends a first downlink control signaling to a terminal, and indicates, through the first downlink control signaling, whether the terminal needs to feed back an acknowledgement message corresponding to a reception of the first downlink control signaling.

In an embodiment, the acknowledgement message herein may be a usual acknowledgement/non-acknowledgement (ACK/NACK) message. For example, if the base station indicates that the terminal needs to feed back an acknowledgment message corresponding to the reception of the first downlink control signaling, the terminal may feed back an ACK message when the first downlink control signaling is successfully received, and feed back a NACK message when the first downlink control signaling is not successfully received. An existing ACK/NACK message is used for feeding back the acknowledgement, and there's no need to construct a new signaling, which can save resources and facilitate adaptation with the existing 5G NR system.

Of course, the acknowledgement message may also be implemented by reconfiguring other existing uplink messages, for example, selecting an idle bit in an existing uplink message to indicate whether the first downlink control signaling is successfully received; or it may be another newly constructed message, such as a short message of one bit, with a value of 1 representing a successful reception and a value of 0 representing an unsuccessful reception to feedback the acknowledgement message. The embodiments of the present disclosure are not limited thereto.

When the base station indicates whether the terminal needs to feed back the acknowledgement message, the base station may adopt an explicit indication or an implicit indication.

In an embodiment, for example, the base station may configure a preset bit in the first downlink control signaling for explicitly indicating whether the terminal needs to feed back the acknowledgement message corresponding to the reception of the first downlink control signaling. If the value of the preset bit is 1, it is indicated that the terminal feeds back the acknowledgement message, and if the value of the preset bit is 0, it is indicated that the terminal does not need to feed back the acknowledgement message.

Alternatively, the implicit indication may also be performed according to specific contents carried in the first downlink control signaling.

For example, the base station may pre-configure a type of information for which the acknowledgement message needs to be fed back, and send the type of the information to the terminal; or the terminal pre-stores a type of the information for which the acknowledgment message needs to be fed back.

whether there is a need to feed back the acknowledgement message corresponding to the reception of the first downlink control signaling is indicated through the type of the information included in the first downlink control signaling.

For example, if the first DCI currently sent by the base station contains important information about configuration of a control channel, or the first DCI contains important information about indication of system information, and these pieces of important information belong to pre-configured or pre-stored important types of information, then the terminal needs to feed back the acknowledgement message for the reception of first DCI when receiving the control signaling including these types.

It should be noted that, in addition to the manner in which the base station indicates in the downlink control signaling, in some specific application scenarios, the base station may flexibly configure the terminal to feed back the acknowledgement message by default, or not to feed back the acknowledgement message by default, according to traffic requirements.

S202, receive the acknowledgement message fed back by the terminal if the base station indicates that the terminal needs to feed back the acknowledgement message corresponding to the reception of the first downlink control signaling.

For the terminal, it does not know in advance when the base station will send the first DCI on which resources, so the terminal performs blind detection on the resources where the physical downlink control channel (PDCCH) is located. If the first DCI detected by the terminal passes the Cyclic Redundancy Check (CRC), the terminal considers that it successfully receives the first DCI sent by the base station, and can then feed back to the base station an acknowledgment message indicating successful reception. If the terminal does not detect the first DCI within a predetermined time period or the first DCI does not pass the cyclic redundancy check, the terminal considers that it does not successfully receive the first DCI sent by the base station, and can then feed back to the base station an acknowledgement message indicating failed reception.

In an embodiment, when the terminal sends the acknowledgment message, the terminal may directly use a specific resource specified by the system to send, or use a specific resource that is pre-negotiated with the base station to send, or the base station may allocate a resource to the terminal for transmission when the acknowledgment message needs to be sent. The embodiments of the present disclosure are not limited thereto.

The base station may determine whether the terminal successfully receives the currently transmitted first DCI according to the received acknowledgment message, and if the it is successfully received, the base station may normally send a subsequent DCI, such as a second DCI, and if it is not successfully received, the base station may retransmit the first DCI.

If the base station indicates that the terminal does not need to feed back the acknowledgement message, the terminal may not feed back the acknowledgement message.

In the embodiments of the present disclosure, when the base station needs to obtain the condition about the reception of the first downlink control signaling by the terminal, the first downlink control signaling can be used to instruct the terminal to feed back an acknowledgement message corresponding to the reception of the first control signaling, which facilitates the base station to directly, accurately and quickly know the reception on the terminal side, facilitates the configuration and transmission of subsequent control signaling, and improves the reliability of a 5G NR system.

Figure 3:
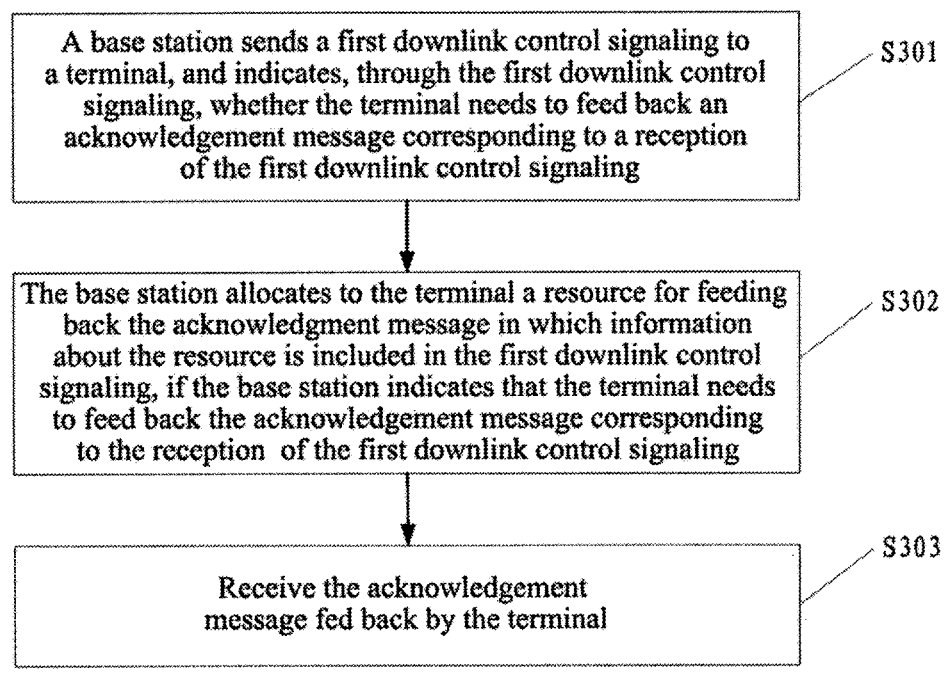
FIG. 3 is a schematic flowchart of a second embodiment of a control signaling transmission method according to the present disclosure.

Please refer to FIG. 3, which is a schematic flowchart of a second embodiment of a control signaling transmission method according to the present disclosure; in the present embodiment, the method includes the following steps:

S301, a base station sends a first downlink control signaling to a terminal, and indicates, through the first downlink control signaling, whether the terminal needs to feed back an acknowledgement message corresponding to a reception of the first downlink control signaling.

S302, the base station allocates to the terminal a resource for feeding back the acknowledgment message in which information about the resource is included in the first downlink control signaling, if the base station indicates that the terminal needs to feed back the acknowledgement message corresponding to the reception of the first downlink control signaling.

In an embodiment, when performing resource allocation, the base station may allocate, according to a current resource occupation, a Physical Uplink Control Channel (PUCCH) resource to the terminal for feeding back the acknowledgement message. For example, if some resources are currently unoccupied, the base station may allocate these resources to the terminal for feeding back the acknowledgement message.

Alternatively, the base station may allocate a reserved physical uplink control channel resource to the terminal for feeding back the acknowledgment message. This part of reserved resources may be configured by the base station according to a feedback requirement of the control signaling in the next period of time. For example, if in the next period of time many control signalings sent by the base station are expected to receive feedback, then some resources may be reserved for the terminal to use during that period of time. For example, if multiple terminals need to feed back for the control signaling in the next period of time, the base station may reserve more resources for the terminals to use. After the acknowledgment messages have been fed back, the base station may release the resources.

Alternatively, the base station also may select at least one resource from a pre-configured candidate resource list of physical uplink control channel and allocate to the terminal for feeding back the acknowledgement message. For example, the base station may configure some candidate resources for feeding back the acknowledgement message to the terminal in advance, and then indicate through the first DCI which resource is specifically used. In an embodiment, the base station may use a Radio Resource Control (RRC) message to configure the candidate resource list of PUCCH in advance, where the PUCCH resource in the list is used by the terminal to feed back the acknowledgement message, and the base station will indicate in a subsequent first DCI which resource of the foregoing list the terminal will use to feed back the acknowledgment message.

It should be noted that the foregoing resources may include time domain resources and/or frequency domain resources and/or code domain resources of the PUCCH.

S303, receive the acknowledgement message fed back by the terminal.

In the present embodiment, the manner in which the base station allocates a resource to the terminal for feeding back the acknowledgment message is specifically described. The base station can flexibly select and configure according to the feedback requirement and the current condition of resource occupation, thereby ensuring that the terminal can feedback the acknowledgement message normally and improving system reliability.

In some application scenarios, important control signaling sent by the base station is often universal, that is, applicable to many terminals. At this time, the base station can transmit some important control signalings to the terminals in a broadcast or multicast manner by using a common downlink control signaling (common DCI). At this time, the terminals may also feed back the acknowledgement message to the base station according to requirements of the base station.

Figure 4:
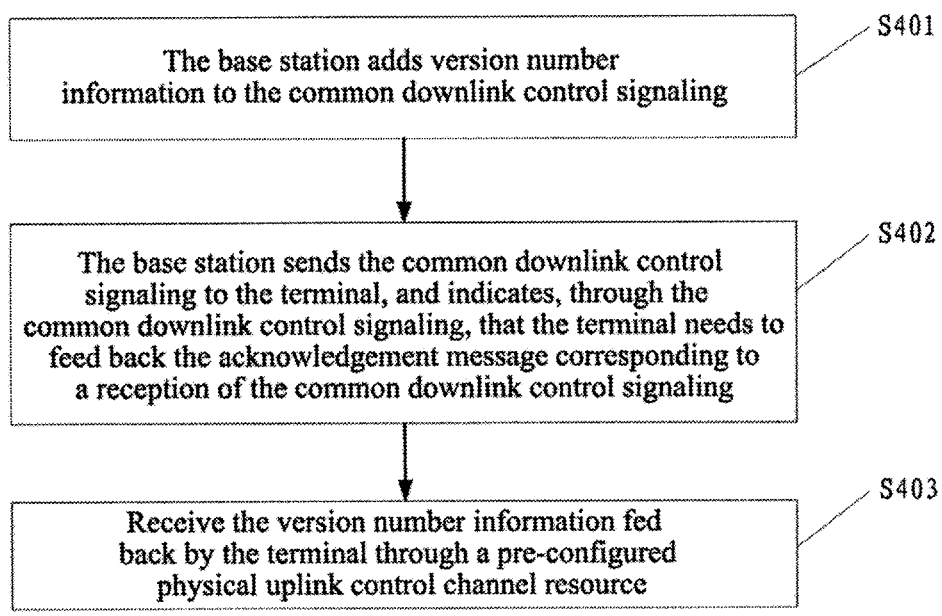
FIG. 4 is a schematic flowchart of a third embodiment of a control signaling transmission method according to the present disclosure.

Please refer to FIG. 4, which is a schematic flowchart of a third embodiment of a control signaling transmission method according to the present disclosure; in the present embodiment, the terminal belongs to a terminal group that receives a same downlink control signaling, and the first downlink control signaling is a common downlink control signaling that is sent to at least two terminals, and the method includes the following steps:

S401, the base station adds version number information to the common downlink control signaling.

The version number information is used to distinguish different common downlink control signalings.

S402, the base station sends the common downlink control signaling to the terminal, and indicates, through the common downlink control signaling, that the terminal needs to feed back the acknowledgement message corresponding to a reception of the common downlink control signaling.

S403, receive the version number information fed back by the terminal through a pre-configured physical uplink control channel resource.

In the present embodiment, when using the common DCI to send the control signaling to a group of terminals, the base station may use an explicit or implicit indication in the embodiment of FIG. 2 to indicate that the terminal needs to acknowledge that the DCI is correctly received. The base station may pre-configure a PUCCH resource to the terminal for feeding back the acknowledgement message by using separate higher layer signaling (such as RRC signaling) or physical layer signaling (such as DCI). The base station can add a version number in the common DCI to distinguish different common downlink control signalings. When the terminal receives a common downlink control signaling, which needs to be acknowledged, in the common DCI, the terminal may feed back the corresponding version number information to the base station on the PUCCH resource pre-configured by the base station. When the base station receives the version number information fed back by the terminal, it can determine which common downlink control signaling is received by which terminal. Of course, in addition to being associated with the common downlink control signaling for distinguishing different common downlink control signalings, the version number may also be associated with specific information included in the common control signaling. The embodiment of the present disclosure is not limited thereto.

Figure 5:
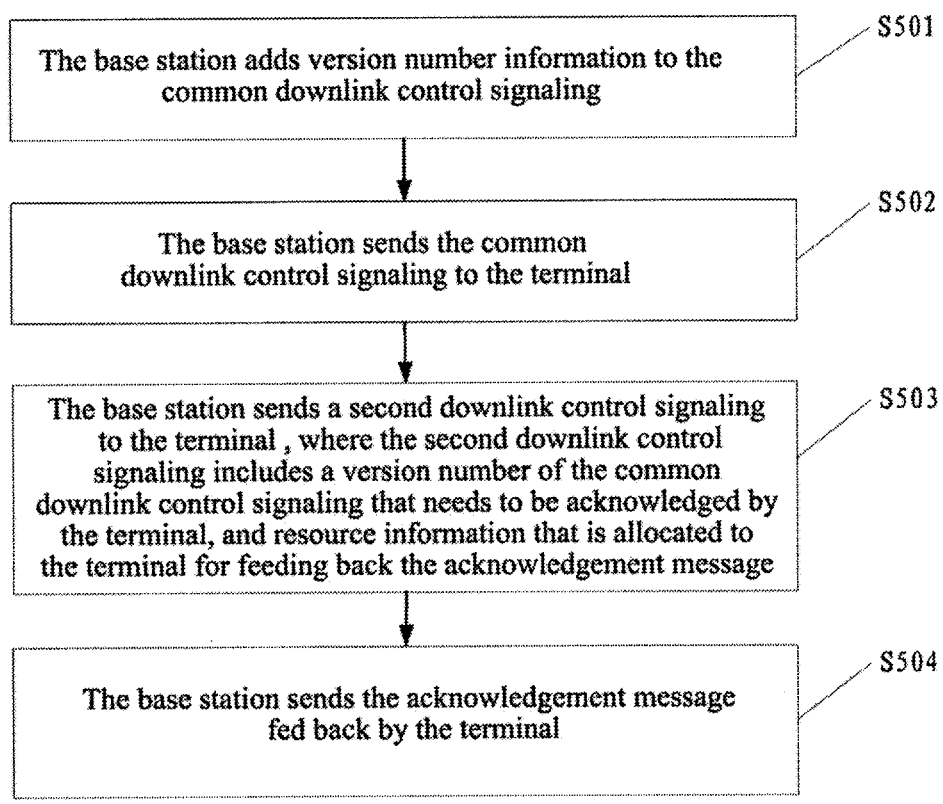
FIG. 5 is a schematic flowchart of a fourth embodiment of a control signaling transmission method according to the present disclosure.

Please refer to FIG. 5, which is a schematic flowchart of a fourth embodiment of the control signaling transmission method according to the present disclosure; in the present embodiment, the terminal belongs to a terminal group that receives a same downlink control signaling, and the first downlink control signaling is a common downlink control signaling that is sent to at least two terminals, and the method includes the following steps;

S501, the base station adds version number information to the common downlink control signaling.

The version number information is used to distinguish different common downlink control signalings.

S502, the base station sends the common downlink control signaling to the terminal.

S503, the base station sends a second downlink control signaling to the terminal.

The second downlink control signaling includes a version number of the common downlink control signaling that needs to be acknowledged by the terminal, and resource information that is allocated to the terminal for feeding back the acknowledgement message.

It should be noted that there is no strict requirement on the time interval between the steps S502 and S503. If it is known that the version number information has been saved, the step S503 can be initiated at any time after the step S502. The embodiment of the present disclosure is not limited thereto.

S504, the base station sends the acknowledgement message fed back by the terminal.

When the base station transmits a control signaling to a group of terminals using the common DCI, the base station cannot confirm that the control signaling is valid for all the terminals. At this time, if all of the receiving terminals are required to feed back the acknowledgement message to the base station, it is likely to cause waste of resources. Therefore, the base station can require a specified terminal to feedback the acknowledgement message according to the base station's need.

Specifically, when using the common DCI to transmit a control signaling to a group of terminals, the base station may add a version number to the control signaling to distinguish different common downlink control signalings. If in a subsequent period of time the base station needs a certain terminal to acknowledge whether a certain control signaling previously transmitted through the common DCI is received, the base station may send a physical layer control signaling to the corresponding terminal by using a second DCI, including the version number information of the common downlink control signaling that needs to be acknowledged by the terminal, and allocate a corresponding PUCCH resource to the terminal. For the manner of resource allocation, refer to the detailed description of the embodiment shown in FIG. 3, which will not be repeated herein again. After the terminal receives the second DCI, if the terminal has received the common downlink control signaling corresponding to the version number, the terminal may transmit an acknowledgement message, such as an ACK message, to the base station on the PUCCH resource indicated by the second DCI. If the terminal does not receive the common downlink control signaling corresponding to the version number, the terminal may transmit an acknowledgement message indicating not received, such as a NACK message, to the base station on the PUCCH resource indicated by the second DCI.

It should be noted that the difference between the embodiment shown in FIG. 5 and the embodiment shown in FIG. 4 mainly lies in: in the embodiment shown in FIG. 4, the base station may indicate whether to feed back the acknowledgement message in the common downlink control signaling, and allocate the resource to the terminal in advance, and the acknowledgement message fed back by the terminal mainly includes the version number information of the common downlink control signaling; while in the embodiment shown in FIG. 5, the base station may not indicate whether to feed back the acknowledgement message in the common downlink control signaling, but may send the second DCI, which carries the version number information of the common downlink control signaling that needs to be acknowledged and the resource information allocated to the terminal, when the base station needs a specific terminal to feed back the acknowledgment message, and the terminal performs feedback after receiving the second DCI. Therefore, the resource consumption can be reduced, and the feedback of the acknowledgement message can be more effective and purposeful.

Figure 6:
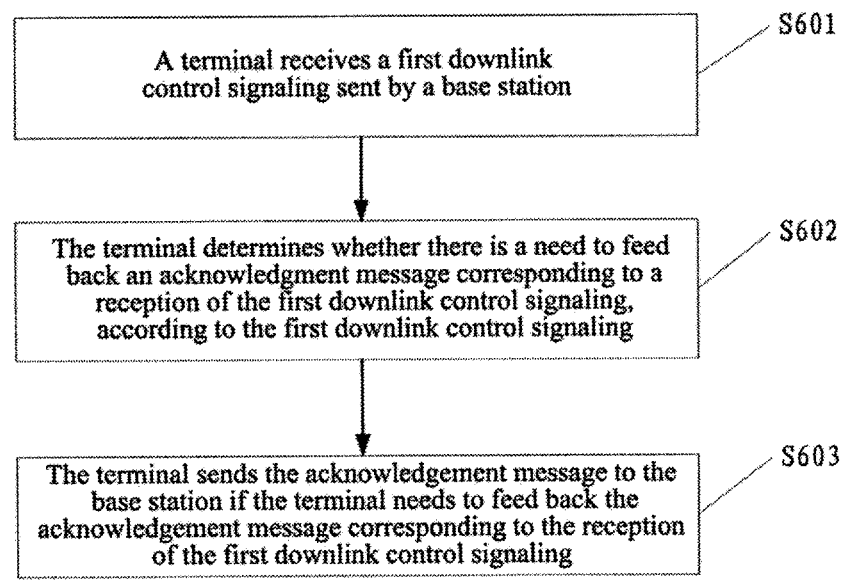
FIG. 6 is a schematic flowchart of a fifth embodiment of a control signaling transmission method according to the present disclosure.

Please refer to FIG. 6, which is a schematic flowchart of a fifth embodiment of a control signaling transmission method according to the present disclosure; in the present embodiment, the control signaling transmission method includes:

S601, a terminal receives a first downlink control signaling sent by a base station.

S602, the terminal determines whether there is a need to feed back an acknowledgment message corresponding to a reception of the first downlink control signaling, according to the first downlink control signaling.

In an embodiment, the terminal may obtain a value of a preset bit in the first downlink control signaling, and determining, according to the value of the preset bit, whether there is a need to feed back the acknowledgement message corresponding to the reception of the first downlink control signaling.

Alternatively, the terminal may receive a type of information pre-configured by the base station and for which the acknowledgment message needs to be fed back, or the terminal pre-stores a type of the information for which the acknowledgment message needs to be fed back.

Whether there is a need to feed back the acknowledgement message corresponding to the reception of the first downlink control signaling is determined according to the type of the information included in the first downlink control signaling.

S603, the terminal sends the acknowledgement message to the base station if the terminal needs to feed back the acknowledgement message corresponding to the reception of the first downlink control signaling.

FIG. 6 is a description of an embodiment on the terminal side. For the details, refer to the description of the embodiment on the base station side shown in FIG. 2, which will not be repeated herein again.

Figure 7:
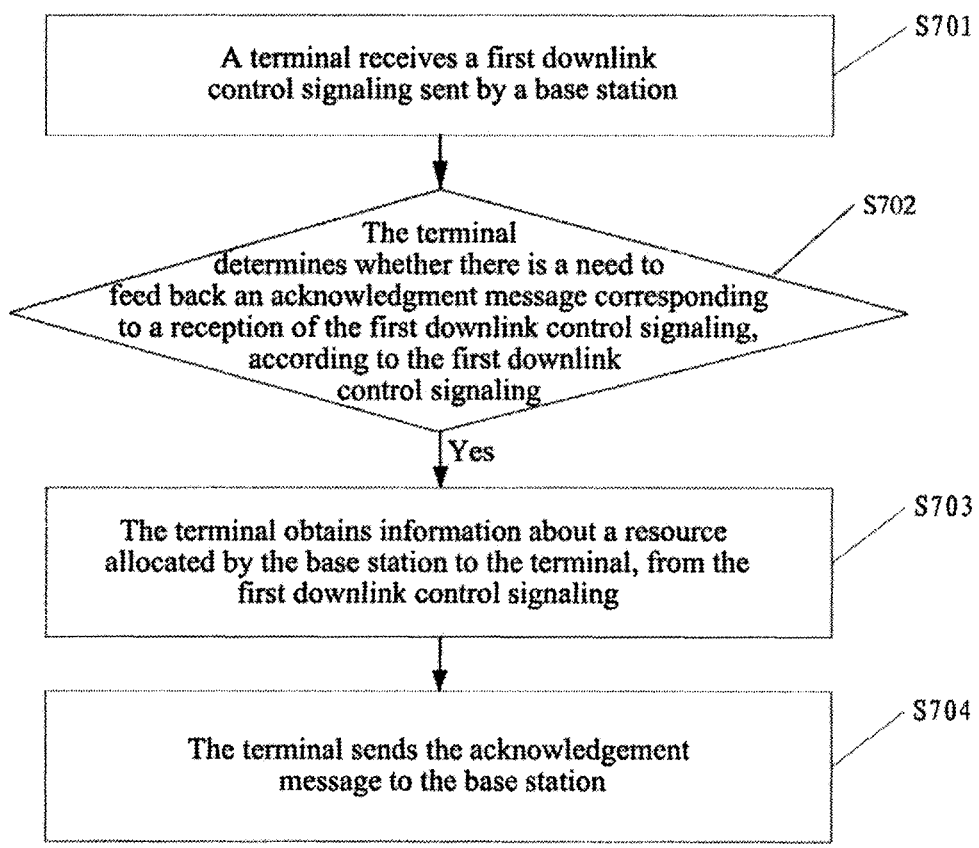
FIG. 7 is a schematic flowchart of a sixth embodiment of a control signaling transmission method according to the present disclosure.

Please refer to FIG. 7, which is a schematic flowchart of a sixth embodiment of a control signaling transmission method according to the present disclosure; in the present embodiment, the control signaling transmission method includes:

S701, a terminal receives a first downlink control signaling sent by a base station.

S702, the terminal determines whether there is a need to feed back an acknowledgment message corresponding to a reception of the first downlink control signaling, according to the first downlink control signaling. If yes, steps S703-S704 are performed, otherwise the acknowledgement message needs not to be fed back.

S703, the terminal obtains information about a resource allocated by the base station to the terminal, from the first downlink control signaling.

The resource is used by the terminal to feed back the acknowledgement message.

S704, the terminal sends the acknowledgement message to the base station.

FIG. 7 is a description of an embodiment on the terminal side. For the details, refer to the description of the embodiment on the base station side shown in FIG. 3, which will not be repeated herein again.

Figure 8:
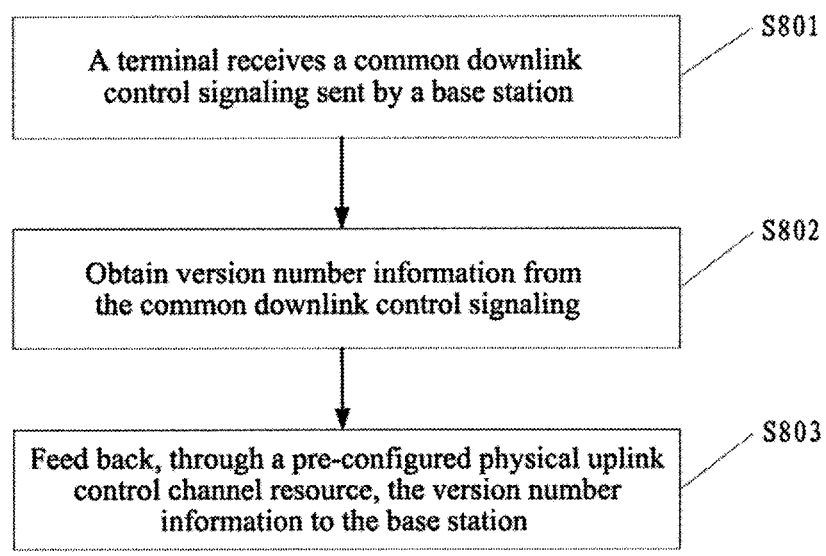
FIG. 8 is a schematic flowchart of a seventh embodiment of a control signaling transmission method according to the present disclosure.

Please refer to FIG. 8, which is a schematic flowchart of a seventh embodiment of a control signaling transmission method according to the present disclosure; in the present embodiment, the control signaling transmission method includes:

S801, a terminal receives a common downlink control signaling sent by a base station.

S802, obtain version number information from the common downlink control signaling.

The version number information is used to distinguish different common downlink control signalings.

S803, feed back, through a pre-configured physical uplink control channel resource, the version number information to the base station.

FIG. 8 is a description of an embodiment on the terminal side. For the details, refer to the description of the embodiment on the base station side shown in FIG. 4, which will not be repeated herein again.

Figure 9:
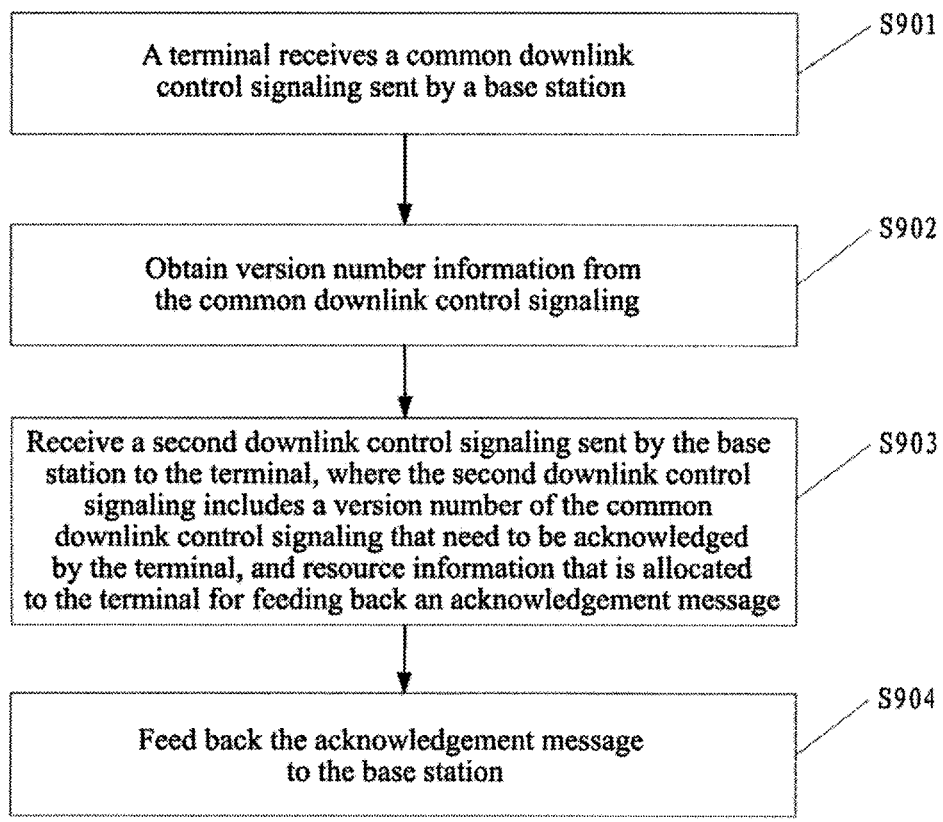
FIG. 9 is a schematic flowchart of an eighth embodiment of a control signaling transmission method according to the present disclosure.

Please refer to FIG. 9, which is a schematic flowchart of an eighth embodiment of a control signaling transmission method according to the present disclosure, in the present embodiment, the control signaling transmission method includes:

S901, a terminal receives a common downlink control signaling sent by a base station.

S902, obtain version number information from the common downlink control signaling.

The version number information is used to distinguish different common downlink control signalings.

S903, receive a second downlink control signaling sent by the base station to the terminal.

The second downlink control signaling includes a version number of the common downlink control signaling that need to be acknowledged by the terminal, and resource information that is allocated to the terminal for feeding back an acknowledgement message.

S904, feed back the acknowledgement message to the base station.

FIG. 9 is a description of an embodiment on the terminal side. For the details, refer to the description of the embodiment on the base station side shown in FIG. 5, which will not be repeated herein again.

Figure 10:
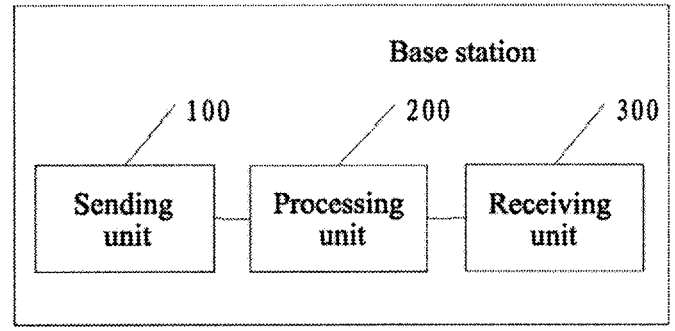
FIG. 10 is a schematic diagram showing the composition of a first embodiment of a base station according to the present disclosure.

Please refer to FIG. 10, which is a schematic diagram showing the composition of a first embodiment of a base station according to the present disclosure; in the present embodiment, the base station includes:

a sending unit 100, configured to send a first downlink control signaling to a terminal;

a processing unit 200, configured to indicate, through the first downlink control signaling, whether the terminal needs to feed back an acknowledgement message corresponding to a reception of the first downlink control signaling;

a receiving unit 300, configured to receive the acknowledgement message fed back by the terminal if the base station indicates that the terminal needs to feed back the acknowledgement message corresponding to the reception of the first downlink control signaling.

In an embodiment, the processing unit 200 is specifically configured to:

configure a preset bit in the first downlink control signaling to indicate whether the terminal needs to feed back the acknowledgement message corresponding to the reception of the first downlink control signaling.

In an embodiment, the processing unit 200 is specifically configured to:

pre-configure a type of information for which the acknowledgment message needs to be fed back, and the sending unit is specifically configured to send the type of the information to the terminal, or a type of the information for which the acknowledgment message needs to be fed back is pre-stored by the terminal; and the processing unit 200 is specifically configured to indicate, through the type of the information included in the first downlink control signaling, whether the terminal needs to feed back the acknowledgement message corresponding to the reception of the first downlink control signaling.

In an embodiment, if the processing unit 200 indicates that the terminal needs to feed back the acknowledgement message corresponding to the reception of the first downlink control signaling, the processing unit 200 is further configured to:

allocate a resource to the terminal for feeding back the acknowledgment message in which information about the resource is included in the first downlink control signaling.

In an embodiment, the processing unit 200 is specifically configured to:

allocate, according to a current resource occupation, a physical uplink control channel resource to the terminal for feeding back the acknowledgement message; or allocate a reserved physical uplink control channel resource to the terminal for feeding back the acknowledgement message; or select at least one resource from a pre-configured candidate resource list of physical uplink control channel and allocate to the terminal for feeding back the acknowledgement message.

In an embodiment, the first downlink control signaling is a common downlink control signaling that is sent to at least two terminals;

the processing unit 200 is further configured to add version number information to the common downlink control signaling, wherein the version number information is used to distinguish different common downlink control signalings; and after sending the common downlink control signaling and indicating, through the common downlink control signaling, that the terminal needs to feed back the acknowledgement message corresponding to the reception of the common downlink control signaling, the receiving unit 300 is further configured to receive the version number information that is fed back by the terminal through the pre-configured physical uplink control channel resource.

In an embodiment, the first downlink control signaling is a common downlink control signaling that is sent to at least two terminals;

the processing unit 200 is further configured to add version number information to the common downlink control signaling, wherein the version number information is used to distinguish different common downlink control signaling; and the sending unit 100 is further configured to send a second downlink control signaling to the terminal after sending the common downlink control signaling, wherein the second downlink control signaling includes a version number of the common downlink control signaling that needs to be acknowledged by the terminal, and resource information that is allocated to the terminal for feeding back the acknowledgement message; and the receiving unit 300 is further configured to receive the acknowledgement message fed back by the terminal.

Figure 11:
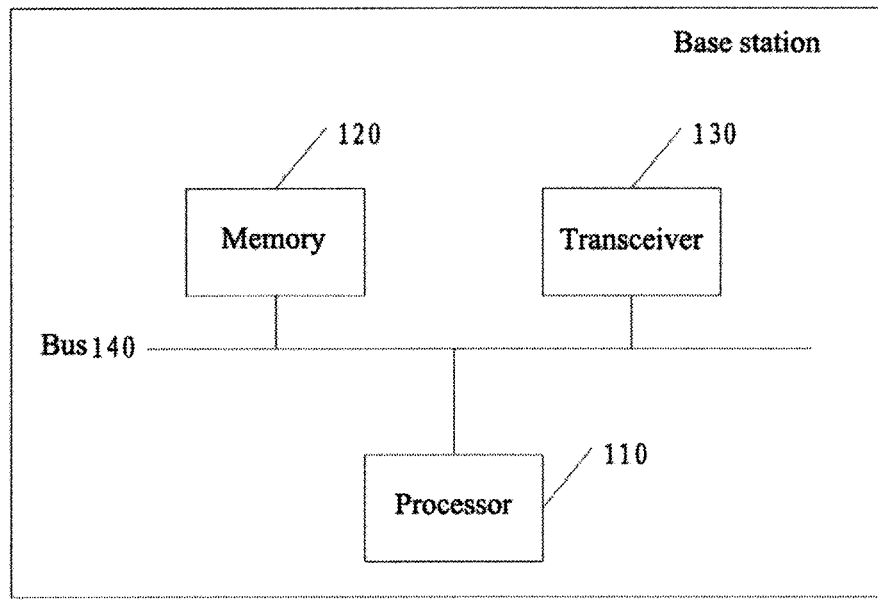
FIG. 11 is a schematic diagram showing the composition of a second embodiment of the base station according to the present disclosure.

Please refer to FIG. 11, which is a schematic diagram showing the composition of a second embodiment of the base station according to the present disclosure; in the present embodiment, the base station includes:

a processor 110, a memory 120, a transceiver 130 and a bus 140, the processor 110, the memory 120 and the transceiver 130 being coupled by the bus 140, wherein the transceiver 130 is configured to transmit and receive signals and communicate with a terminal, the memory 120 is configured to store a set of program codes, and the processor 110 is configured to invoke the program codes stored in the memory 120 and perform the following operations:

sending, through the transceiver 130, a first downlink control signaling to the terminal, and indicating, through the first downlink control signaling, whether the terminal needs to feed back an acknowledgement message corresponding to a reception of the first downlink control signaling; and receiving, through the transceiver 130, the acknowledgement message fed back by the terminal if the base station indicates that the terminal needs to feed back the acknowledgement message corresponding to the reception of the first downlink control signaling.

In an embodiment, the processor 110 is specifically configured to configure a preset bit in the first downlink control signaling to indicate whether the terminal needs to feed back the acknowledgement message corresponding to the reception of the first downlink control signaling.

In an embodiment, the processor 110 is specifically configured to pre-configure a type of information for which the acknowledgment message needs to be fed back, and send, through the transceiver, the type of the information to the terminal, or the type of the information that needs to feed back the acknowledgement message is prestored by the terminal; and the processor 110 is specifically configured to indicate, through the type of the information included in the first downlink control signaling, whether the terminal needs to feed back the acknowledgement message corresponding to the reception of the first downlink control signaling.

In an embodiment, if the base station indicates that the terminal needs to feed back the acknowledgement message corresponding to the reception of the first downlink control signaling, the processor 110 is further configured to:

allocate to the terminal a resource for feeding back the acknowledgment message in which information about the resource is included in the first downlink control signaling.

In an embodiment, the processor 110 is specifically configured to:

allocate, according to a current resource occupation, a physical uplink control channel resource to the terminal for feeding back the acknowledgement message; or allocate a reserved physical uplink control channel resource to the terminal for feeding back the acknowledgement message; or select at least one resource from a pre-configured candidate resource list of physical uplink control channel and allocate to the terminal for feeding back the acknowledgement message.

In an embodiment, the first downlink control signaling is a common downlink control signaling that is sent to at least two terminals;

the processor 110 is further configured to add version number information to the common downlink control signaling, wherein the version number information is used to distinguish different common downlink control signalings; and receive, through the transceiver 130, the version number information that is fed back by the terminal on the pre-configured physical uplink control channel resource, after sending the common downlink control signaling and indicating, through the common downlink control signaling, that the terminal needs to feed back the acknowledgement message corresponding to the reception of the common downlink control signaling.

In an embodiment, the first downlink control signaling is a common downlink control signaling that is sent to at least two terminals;

the processor 110 is further configured to add version number information to the common downlink control signaling, wherein the version number information is used to distinguish different common downlink control signalings; and send, through the transceiver 130, a second downlink control signaling to the terminal after sending the common downlink control signaling, wherein the second downlink control signaling includes a version number of the common downlink control signaling that needs to be acknowledged by the terminal, and resource information that is allocated to the terminal for feeding back the acknowledgement message; and receive, through the transceiver 130, the acknowledgement message fed back by the terminal.

Figure 12:
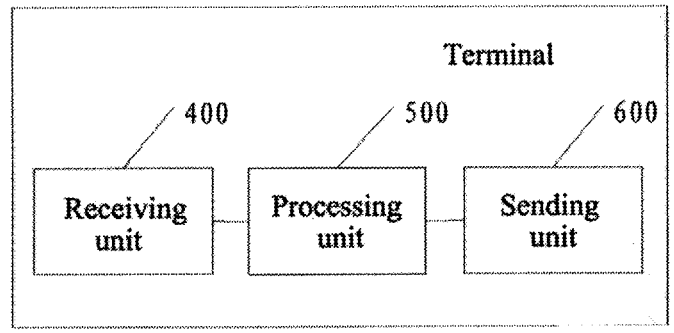
FIG. 12 is a schematic diagram showing the composition of a first embodiment of a terminal according to the present disclosure.

Please refer to FIG. 12, which is a schematic diagram showing the composition of a first embodiment of a terminal according to the present disclosure, in the present embodiment, the terminal includes:

a receiving unit 400, configured to receive a first downlink control signaling sent by a base station;

a processing unit 500, configured to determine, through the first downlink control signaling, whether there is a need to feed back an acknowledgment message corresponding to a reception of the first downlink control signaling; and a sending unit 600, configured to send the acknowledgement message to the base station if the terminal needs to feed back the acknowledgement message corresponding to the reception of the first downlink control signaling.

In an embodiment, the processing unit 500 is specifically configured to:

obtain a value of a preset bit in the first downlink control signaling, and determine, according to the value of the preset bit, whether there is a need to feed back the acknowledgement message corresponding to the reception of the first downlink control signaling.

In an embodiment, the receiving unit 400 is further configured to receive a type of information pre-configured by the base station and for which the acknowledgment message needs to be fed back, or a type of the information for which the acknowledgment message needs to be fed back is pre-stored by the terminal;

the processing unit 500 is specifically configured to determine, according to the type of the information included in the first downlink control signaling, whether there is a need to feed back the acknowledgement message corresponding to the reception of the first downlink control signaling.

In an embodiment, if the terminal needs to feed back the acknowledgement message corresponding to the reception of the first downlink control signaling, the processing unit 500 is further configured to obtain information about a resource allocated by the base station to the terminal, from the first downlink control signaling, wherein the resource is used by the terminal to feed back the acknowledgement message.

In an embodiment, the terminal belongs to a terminal group that receives a same downlink control signaling, and the first downlink control signaling is a common downlink control signaling that is sent to at least two terminals;

the processing unit 500 is further configured to obtain version number information from the common downlink control signaling, wherein the version number information is used to distinguish different common downlink control signalings.

the sending unit 600 is further configured to feed back, through a pre-configured physical uplink control channel resource, the version number information to the base station.

In an embodiment, the terminal belongs to a terminal group that receives a same downlink control signaling, and the first downlink control signaling is a common downlink control signaling that is sent to at least two terminals;

the processing unit 500 is further configured to obtain version number information from the common downlink control signaling, wherein the version number information is used to distinguish different common downlink control signalings;

the receiving unit 400 is further configured to receive a second downlink control signaling sent by the base station to the terminal, wherein the second downlink control signaling includes a version number of the common downlink control signaling that needs to be acknowledged by the terminal, and resource information that is allocated to the terminal for feeding back the acknowledgement message; and the sending unit 600 is further configured to feed back the acknowledgement message to the base station.

Figure 13:
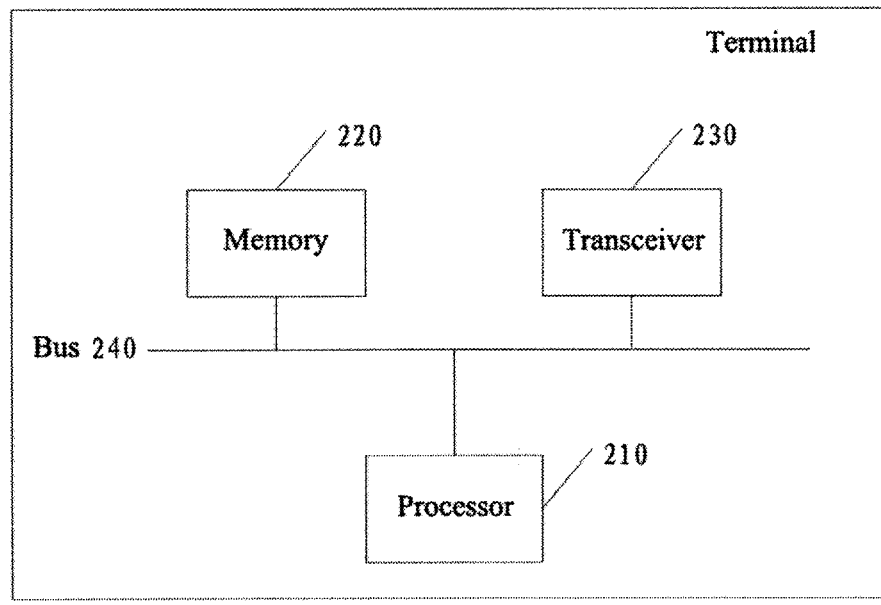
FIG. 13 is a schematic diagram showing the composition of a second embodiment of the terminal according to the present disclosure.

Please refer to FIG. 13, which is a schematic diagram showing the composition of a second embodiment of the terminal according to the present disclosure; in the present embodiment, the terminal includes:

a processor 210, a memory 220, a transceiver 230 and a bus 240, the processor 210, the memory 220 and the transceiver 230 being coupled by the bus 240, where the transceiver 230 is configured to transmit and receive signals and communicate with a base station, the memory 220 is configured to store a set of program codes, the processor 210 is configured to invoke the program codes stored in memory 220 and perform the following operations:

receiving, through the transceiver 230, a first downlink control signaling sent by the base station;

determining, according to the first downlink control signaling, whether there is a need to feed back an acknowledgment message corresponding to a reception of the first downlink control signaling; and sending, through the transceiver 230, the acknowledgement message to the base station if the terminal needs to feed back the acknowledgement message corresponding to the reception of the first downlink control signaling.

In an embodiment, the processor 210 is specifically configured to:

obtain a value of a preset bit in the first downlink control signaling, and determine, according to the value of the preset bit, whether there is a need to feed back the acknowledgement message corresponding to the reception of the first downlink control signaling.

In an embodiment, the processor 210 is specifically configured to:

receive, through the transceiver, a type of information pre-configured by the base station and for which the acknowledgment message needs to be fed back, or a type of the information for which the acknowledgment message needs to be fed back is pre-stored by the terminal; and determine, according to the type of the information included in the first downlink control signaling, whether there is a need to feed back the acknowledgement message corresponding to the reception of the first downlink control signaling.

In an embodiment, if the terminal needs to feed back the acknowledgement message corresponding to the reception of the first downlink control signaling, the processor 210 is further configured to:

obtain information about a resource allocated by the base station to the terminal, from the first downlink control signaling, wherein the resource is used by the terminal to feed back the acknowledgement message.

In an embodiment, the terminal belongs to a terminal group that receives a same downlink control signaling, and the first downlink control signaling is a common downlink control signaling that is sent to at least two terminals;

the processor 210 is further configured to obtain version number information from the common downlink control signaling, wherein the version number information is used to distinguish different common downlink control signalings;

feed back, through the transceiver 230, the version number information to the base station through a preconfigured physical uplink control channel resource.

In an embodiment, the terminal belongs to a terminal group that receives a same downlink control signaling, and the first downlink control signaling is a common downlink control signaling that is sent to at least two terminals;

the processor 210 is further configured to obtain version number information from the common downlink control signaling, wherein the version number information is used to distinguish different common downlink control signalings;

receive, through the transceiver 230, a second downlink control signaling sent by the base station to the terminal, wherein the second downlink control signaling includes a version number of the common downlink control signaling that needs to be acknowledged by the terminal, and resource information that is allocated to the terminal for feeding back the acknowledgement message; and feed back, through the transceiver 230, the acknowledgement message to the base station.

The base station described in the embodiments of the present disclosure may be used to implement some or all of the processes in the method embodiments described in the present disclosure with reference to FIG. 2 to FIG. 5, and to perform some or all of the functions of the device embodiments described in the present disclosure with reference to FIG. 10. The terminal described in the embodiment of the present disclosure may be used to implement some or all of the processes in the method embodiments described in the present disclosure with reference to FIG. 6 to FIG. 9, and to perform some or all of the functions of the device embodiments described in the present disclosure with reference to FIG. 12, which are not repeated herein.

In one or more examples, the functions described may be implemented in hardware, software, firmware, or any combination thereof. If implemented in software, the functions may be stored on or transmitted via a computer-readable medium as one or more instructions or codes and executed by a hardware-based processing unit. The computer readable medium can include a computer readable storage medium (which corresponds to a tangible medium such as a data storage medium), or a communication medium including, for example, any medium that facilitates transfer of a computer program from one place to another in accordance with a communication protocol. In this manner, the computer readable medium generally may correspond to (1) a non-transitory tangible computer readable storage medium, or (2) a communication medium such as a signal or carrier wave. The data storage medium may be any available medium that can be accessed by one or more computers or one or more processors to retrieve instructions, codes and/or data structures for use in carrying out the techniques described herein. A computer program product can include the computer readable medium.

By way of example and not limitation, some computer readable storage medium may include RAM, ROM, EEPROM, CD-ROM or other optical disk storage, magnetic disk storage or other magnetic storage device, flash memory, or any other medium that can be used to store desired program codes in the form of instruction or data structure and can be accessed by a computer. Also, any coupling can be properly referred to as a computer-readable medium. For example, if instructions are sent from a website, server, or other remote source using coaxial cable, fiber optic cable, twisted pair, digital subscriber line (DSL), or wireless technology (e.g., infrared, radio, and microwave), then the coaxial cable, fiber optic cable, twisted pair, DSL, or wireless technologies (e.g., infrared, radio, and microwave) are included in the definition of the medium. However, it should be understood that the computer readable storage medium and the data storage medium do not include connections, carrier waves, signals, or other transient medium, but rather relate to non-transitory tangible storage medium. As used herein, a magnetic disk and an optical disk include a compact disk (CD), a laser disk, an optical disk, a digital video disk (DVD), a flexible disk, and a Blu-ray disk, where magnetic disks typically replicate data magnetically, while optical disks optically replicate data by laser. Combinations of the above should also be included within the scope of the computer readable medium.

The instructions may be executed by one or more processors such as one or more digital signal processors (DSPs), general purpose microprocessors, application specific integrated circuits (ASICs), field programmable logic arrays (FPGAs) or other equivalent integrated or discrete logic circuits. Accordingly, the term "processor," as used herein, may refer to any of the foregoing structures or any other structure suitable for implementing the techniques described herein. In addition, in some aspects, the functionality described herein may be provided within dedicated hardware and/or software modules configured for encoding and decoding, or incorporated in a combined codec. Moreover, the techniques can be fully implemented in one or more circuits or logic elements.

The techniques of the present disclosure can be broadly implemented by a variety of apparatuses or devices, including a wireless handset, an integrated circuit (IC), or a collection of ICs (e.g., a chipset). Various components, modules or units are described in this invention to emphasize functional aspects of the device configured to perform the disclosed techniques, but are not necessarily required to be implemented by different hardware units. Specifically, as described above, various units may be combined in a codec hardware unit or provided by a collection of interoperable hardware units (including one or more processors as described above) in conjunction with suitable software and/or firmware.

It should be understood that the feature "one embodiment" or "an embodiment" as used throughout the specification means that a particular feature, structure, or characteristic relating to an embodiment is included in at least one embodiment of the present disclosure. Thus, "in one embodiment" or "in an embodiment", which is used throughout the specification, does not necessarily mean the same embodiment. In addition, these particular features, structures, or characteristics may be combined in any suitable manner in one or more embodiments.

In the various embodiments of the present disclosure, it should be understood that the sequence numbers of the above processes do not imply a sequence of executions, and the order of execution of each process should be determined by its function and internal logic, and should not be construed as limiting the implementation process of the embodiments of the present disclosure.

Additionally, terms "system" and "network" are used interchangeably herein. It should be understood that the term "and/or" in this context is merely an association relationship describing associated objects, indicating that there may be three relationships. For example, A and/or B may indicate that A exists separately, and A and B exist simultaneously, and B exists separately. In addition, the character "/" herein generally indicates that the contextual object is in an "or" relationship.

In the embodiments provided herein, it should be understood that "B corresponding to A" means that B is associated with A, and B can be determined according to A. However, it should also be understood that determining B according to A does not mean that B is determined only according to A, but that B can also be determined according to A and/or other information.

Those of ordinary skill in the art will appreciate that the units and algorithm steps of the various examples described in connection with the embodiments disclosed herein can be implemented in electronic hardware, computer software, or a combination of both. To clearly illustrate the interchangeability of hardware and software, the components and steps of the various examples have been generally described in terms of functionality in the above description. Whether these functions are performed in hardware or software depends on the specific application and design constraints of the technical solution. Those skilled in the art may implement the described functions in different ways for each particular application, but such implementation should not be considered to be beyond the scope of the present disclosure.

Those skilled in the art can clearly understand that for the convenience and brevity of the description, the specific working process of the system, the device and the unit described above can refer to the corresponding process in the foregoing method embodiment, which will not be repeated herein.

In the several embodiments provided by the present disclosure, it should be understood that the disclosed systems, devices, and methods may be implemented in other manners. For example, the device embodiments described above are merely illustrative. For example, the division of the unit is only a logical function division, and in actual implementation there may be another division manner. For example, multiple units or components may be combined or integrated into another system, or some features may be omitted or not implemented. In addition, the mutual coupling or direct coupling or communication connection shown or discussed may be an indirect coupling or communication connection through some interfaces, devices or units, and may be in an electrical, mechanical or other form.

The units described as separate components may or may not be physically separated, and the components illustrated as units may or may not be physical units, that is, may be located in one place, or may be distributed to multiple network units. Some or all of the units may be selected according to actual needs to achieve the purpose of the solution of the embodiment.

In addition, each functional unit in each embodiment of the present disclosure may be integrated into one processing unit, or each unit may exist physically separately, or two or more units may be integrated into one unit.

The above description is only the specific embodiments of the present disclosure, but the scope of protection of the present disclosure is not limited thereto. Any variation or substitution that is readily conceivable within the scope of the present disclosure by those skilled in the art shall be covered within the scope of protection of the present disclosure. Therefore, the scope of protection of the present disclosure should be determined by the scope of protection of the appended claims.

What is claimed is:

1. A control signaling transmission method, comprising:
receiving, by a terminal, a first downlink control signaling sent by a base station; wherein the first downlink control signaling is carried in a physical downlink control channel (PDCCH);
obtaining, by the terminal, a value of a preset bit in the first downlink control signaling, and determining, according to the value of the preset bit, whether there is a need to send acknowledgement information for feeding back a reception of the first downlink control signaling, wherein the acknowledgement information comprises an acknowledgement message and a non-acknowledgement message; and
if the terminal needs to send the acknowledgement information for feeding back the reception of the first downlink control signaling:
obtaining, by the terminal, from the first downlink control signaling, information about a resource allocated by the base station to the terminal, wherein the resource is a reserved physical uplink control channel (PUCCH) resource allocated by the base station to the terminal for feeding back the acknowledgement information; wherein the information about the resource is comprised in the first downlink control signaling, and the reserved PUCCH resource is determined by the base station based on a feedback requirement of control signaling in a period of time, and an unused resource in the reserved PUCCH resource is released after the base station receives the acknowledgement information;
sending, by the terminal, the acknowledgement message to the base station through the allocated resource when the first downlink control signaling is successfully received and sending the non-acknowledgement message to the base station through the allocated resource when the first downlink control signaling is not successfully received;
if sending the non-acknowledgement message to the base station, receiving, by the terminal, the first downlink control signaling retransmitted by the base station; and
if sending the acknowledgement message to the base station, receiving, by the terminal, a subsequent first downlink control signaling.

2. The method according to claim 1, wherein the terminal belongs to a terminal group that receives a same downlink control signaling, and the first downlink control signaling is a common downlink control signaling that is sent to at least two terminals, and the method further comprises:
obtaining version number information from the common downlink control signaling, wherein the version number information is used to distinguish different common downlink control signalings; and
feeding back, through a pre-configured physical uplink control channel resource, the version number information to the base station.

3. A base station, comprising:
a processor, a memory, a transceiver and a bus, the processor, the memory and the transceiver being coupled by the bus, wherein the transceiver is configured to transmit and receive signals and communicate with a terminal, the memory is configured to store a set of program codes, and the processor is configured to invoke the program codes stored in the memory and perform following operations:
configuring a preset bit in the first downlink control signaling, and indicating, through the value of the preset bit, whether the terminal needs to send acknowledgement information for feeding back a reception of the first downlink control signaling, wherein the acknowledgement information comprises an acknowledgement message and a non-acknowledgement message;
sending, through the transceiver, the first downlink control signaling to the terminal, wherein the first downlink control signaling is carried in a physical downlink control channel (PDCCH); and
if the base station indicates that the terminal needs to feed back the acknowledgement information corresponding to the reception of the first downlink control signaling:
allocating, to the terminal, a resource for feeding back the acknowledgement information, wherein information about the resource is comprised in the first downlink control signaling; and wherein the allocating, to the terminal, a resource for feeding back the acknowledgement information comprises: allocating a reserved physical uplink control channel (PUCCH) resource to the terminal for feeding back the acknowledgement information;
receiving, through the transceiver, the acknowledgement message fed back by the terminal when the first downlink control signaling is successfully received by the terminal and receiving, through the transceiver, the non-acknowledgement message fed back by the terminal when the first downlink control signaling is not successfully received by the terminal;
wherein the processor is further configured to:
determine the reserved PUCCH resource based on a feedback requirement of control signaling in a period of time, and release an unused resource in the reserved PUCCH resource after the transceiver receives the acknowledgement information;
if the transceiver receives the non-acknowledgement message fed back by the terminal, the transceiver is further configured to retransmit the first downlink control signaling;
if the transceiver receives the acknowledgement message fed back by the terminal, the transceiver is further configured to transmit a subsequent first downlink control signaling.

4. The base station according to claim 3, wherein the first downlink control signaling is a common downlink control signaling that is sent to at least two terminals,
the processor is further configured to add version number information to the common downlink control signaling, wherein the version number information is used to distinguish different common downlink control signaling; and
receive, through the transceiver, the version number information that is fed back by the terminal through a pre-configured physical uplink control channel resource, after sending the common downlink control signaling and indicating, through the common downlink control signaling, that the terminal needs to feed back the acknowledgement information corresponding to the reception of the common downlink control signaling.

5. A terminal, comprising:
a processor, a memory, a transceiver and a bus, the processor, the memory and the transceiver being coupled by the bus, wherein the transceiver is configured to transmit and receive signals and communicate with a base station, the memory is configured to store a set of program codes, and the processor is configured to invoke the program codes stored in the memory and perform following operations:
receiving, through the transceiver, a first downlink control signaling sent by the base station; wherein the first downlink control signaling is carried in a physical downlink control channel (PDCCH);
obtaining, by the terminal, a value of a preset bit in the first downlink control signaling, and determining, according to the value of the preset bit, whether there is a need to send acknowledgement information feeding back a reception of the first downlink control signaling, wherein the acknowledgement information comprises an acknowledgement message and a non-acknowledgement message; and
if the terminal needs to send the acknowledgement information for feeding back the reception of the first downlink control signaling:
obtaining, from the first downlink control signaling, information about a resource allocated by the base station to the terminal, wherein the resource is a reserved physical uplink control channel (PUCCH) resource allocated by the base station to the terminal for feeding back the acknowledgement information; wherein the information about the resource is comprised in the first downlink control signaling, wherein the reserved PUCCH resource is determined by the base station based on a feedback requirement of control signaling in a period of time, and an unused resource in the reserved PUCCH resource is released after the base station receives the acknowledgement information;
sending, through the transceiver, the acknowledgement message to the base station through the allocated resource when the first downlink control signaling is successfully received and sending, through the transceiver, the non-acknowledgement message to the base station through the allocated resource when the first downlink control signaling is not successfully received;
if the transceiver sends the non-acknowledgement message to the base station, the transceiver is further configured to receive the first downlink control signaling retransmitted by the base station;
if the transceiver sends the acknowledgement message to the base station, the transceiver is further configured to receive a subsequent first downlink control signaling.

6. The terminal according to claim 5, wherein the terminal belongs to a terminal group that receives a same downlink control signaling, and the first downlink control signaling is a common downlink control signaling that is sent to at least two terminals,
the processor is further configured to obtain version number information from the common downlink control signaling, wherein the version number information is used to distinguish different common downlink control signalings; and
feed back, through the transceiver, the version number information to the base station through a pre-configured physical uplink control channel resource.

* * * * *